June 15, 1965 J. F. GRADO 3,189,353

RECORD CLEANING DEVICE FOR MOUNTING ON A RECORD CHANGER TONE ARM

Filed Sept. 19, 1962

INVENTOR.
JOSEPH F. GRADO
BY
Amster & Levy
ATTORNEYS

United States Patent Office 3,189,353
Patented June 15, 1965

3,189,353

RECORD CLEANING DEVICE FOR MOUNTING ON A RECORD CHANGER TONE ARM

Joseph F. Grado, 641 46th St., Brooklyn 20, N.Y.

Filed Sept. 19, 1962, Ser. No. 224,650
6 Claims. (Cl. 274—47)

The present invention relates generally to phonograph equipment and specifically to a record cleaning device adapted to be mounted on the tone arm of a record changer.

The recurring problem of dust accumulation on the surface of a vinyl long playing record has prompted the development of a number of means for cleaning the records. In addition to the attempts to provide means for wiping the record clean of dust particles, attempts have been made to decrease the static electricity in the vinyl record thereby to decrease the attraction of dust particles. Although simple wiping techniques are somewhat effective, damage often results to the record due to the abrasive effects of the dust particles against the delicate surface of the record and also due to the difficulty in handling the rather unwieldy disc. The provision of a clip-on brush for securement to a tone arm produces marked simplicity in record cleaning devices for use with phonograph tone arms, however, these brushes do not function as well as may be desired. The uncertainties of weight distribution resulting from a brush mounted on the tone arm and contacting the record surface are difficult to control, the ends of the bristles riding in the grooves of the record may produce harmful effects, and, most importantly, such brushes do not remove dust from the record but merely move it from one location to another. Nevertheless, there are distinct advantages to be gained in convenience from mounting a record cleaning device on the tone arm of a record phonograph or changer. Therefore, it is desirable to provide a record cleaning device for securement to a tone arm which functions efficiently and which avoids the defects of the prior art devices.

Accordingly, it is a general object of the present invention to provide a record cleaning device for securement to the tone arm of a record player. Specifically, it is an object of the present invention to provide a record cleaning device for attachment to a record player tone arm which effectively cleans the record surface, which does not interfere with the normal playing functions of the record player, especially if it is an automatic record changer, and which produces known and controllable weight factors on the tone arm stylus.

In accordance with one illustrative embodiment of the present invention, there is provided a record cleaning device for securement to the tone arm of a record changer. A bracket is provided with securement means such as adhesive for attachment to the tone arm. The bracket supports a vertical mounting pin forwardly of the tone arm and substantially in alignment with the tone arm stylus. A cleaning pad carrier is formed with an opening in one end which is slightly larger than the diameter of the mounting pin and is engaged thereabout. The walls of the opening are necked down at one point along the length of the opening to provide a line contact between the cleaning pad carrier and the mounting pin. A longitudinal cleaning pad is secured to the carrier at the end opposite from the pin opening and is oriented perpendicular to a line between the mounting post opening and the pad. A resilient ring, frictionally engaged with the mounting pin, is provided to adjustably position the carrier at a selected location along the length of the mounting pin. The cooperating necked down portion of the carrier portion and the mounting pin are sized such that the carrier is loosely supported by the mounting pin when the tone arm is on a record with the carrier perpendicular to the mounting post and the cleaning pad in contact with the surface of the record and such that the carrier is firmly engaged with the mounting post when the tone arm is lifted from a record with the carrier being moved from perpendicular orientation with regard to the mounting pin.

The above brief description, as well as further objects, features and advantages of the present invention will be best appreciated by reference to the following detailed disclosure when taken in conjunction with the accompanying drawings wherein.

Figure 2:
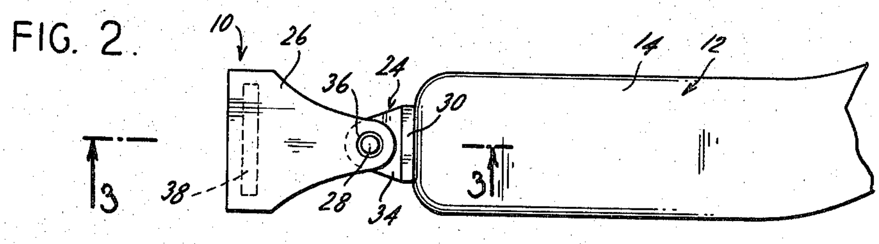
FIG. 2 is a plan view of the device shown in FIG. 1.
Figure 3:
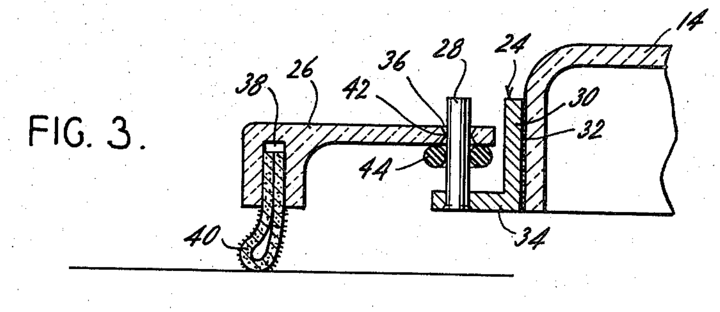
Figure 4:
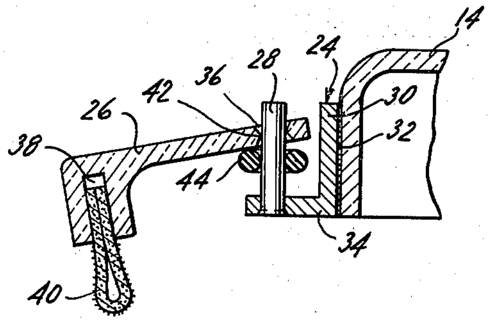

FIG. 3 is a sectional view taken along the line 3—3 of FIG. 2 and looking in the direction of the arrows illustrating the record cleaning device in its operative position engaged with the surface of a record and the cleaning pad carrier loosely connected to the mounting pin; and FIG. 4 is a sectional view similar to that of FIG. 3, illustrating the interengagement of the cleaning pad carrier with the mounting pin when the tone arm is lifted from the surface of a record and the cleaning device is in its inoperative position.

Figure 1:
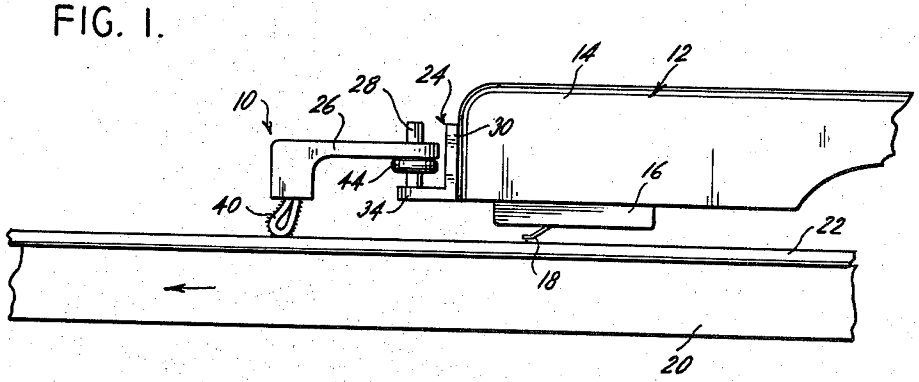
FIG. 1 is a side elevational view of a record cleaning device according to the present invention mounted on a phonograph tone arm and shown with the tone arm engaged with a record on a turntable.

Referring now specifically to the drawings, there is shown in FIG. 1 a record cleaning device, generally designated by the numeral 10 which is mounted on a tone arm 12. The tone arm includes a case 14, a pick up 16 and a stylus 18 and is shown in its cooperative position with phonograph turntable 20 upon which is positioned a phonograph record 22.

The cleaning device 10 includes a bracket 24 for securement to the tone arm case 14 and a cleaning pad carrier 26 loosely carried by a vertical mounting pin 28. The bracket 24 is generally L-shaped in cross section and includes a vertical leg 30 which may be adhesively secured as at 32 to the front of the tone arm case 14, and a horizontal leg 34 which extends outwardly from the tone arm 12. The vertical mounting pin 28 is secured to or is integrally formed with the horizontal leg 34 of the bracket 24 such that it is positioned forwardly of the stylus 18 and substantially in line therewith.

The cleaning pad carrier 26 is, in this illustrative embodiment, generally triangular in shape and includes at its narrow end a mounting opening 36 and at its opposite end a cleaning pad opening 38. The cleaning pad opening 38 is formed perpendicular to the longitudinal axis of the carrier 26 such that a cleaning pad 40 secured therein is substantially perpendicular to the grooves of the record 24 when the mechanisms are in the position as shown in FIGS. 1, 2 and 3. As may be seen in FIG. 3, the cleaning pad 40 comprises a folded over piece of material which is secured, adhesively or otherwise, into the opening 38. A velvet material has been found to be advantageous for use as the cleaning pad 40. It should be noted that the carrier 26 is formed with its greater bulk at the left hand end as viewed in the drawings, the end with the cleaning pad 40, such that very little of the weight of the cleaning pad carrier 26 and cleaning pad 40 is carried by the tone arm 12 when in use as described below.

The mounting opening 36 in the carrier 26 is shaped with a necked-down portion, at 42, which is very slightly greater in diameter than the diameter of the mounting pin 28. It will be appreciated that when the body of the carrier 26 is perpendicular to the pin 28, as in FIGS. 1 and 3, a loose interconnection will be effective between the carrier 26 and the mounting pin 28. Thus, as the turntable 20 moves in its clockwise rotation illustrated by the arrow pointed toward the left in FIG. 1, and as the record 22 is similarly moved, a relative velocity exists not only between the record 22 and the stylus 18, but also between the record 22 and the cleaning pad 40. This relative motion produces a sweeping effect by the cleaning pad 40 on the surface of the record 22 and is effective to maintain the carrier 26 in an in-line relationship between the stylus 18 and the cleaning pad 40 with the mounting pin 28 loosely supporting the cleaning pad carrier 26. When the tone arm 12 is lifted upwardly, either by manual means or by the changing means incorporated in an automatic record changer, the slight tilting action of the cleaning pad carrier 26 illustrated in FIG. 4 is sufficient to produce a binding force between the necked-down portion 42 of the mounting opening 36 and the outer surface of the mounting pin 28. Thus, immediately after the first slight upward movement of the tone arm 12, the carrier member 26 is no longer loosely connected to the tone arm 12 but is rigidly connected thereto such that it is carried through the various movements of the tone arm 14 as it is moved by the operator of the tone arm or by the mechanisms of the automatic record changer.

The normal position of the carrier member 26 along the length of the mounting pin 28 is conveniently governed by the use of adjustable positioning means comprising a resilient annular member 44 which is frictionally received about the mounting pin 28. It will be appreciated that the relatively light vertical force applied to the tone arm 12 from the carrier 26 is transmitted through the positioning member 44. It will also be appreciated that the positioning member 44 may be moved to any desired position along the length of the mounting pin 28. This adjustment feature provides for simple installation of the record cleaning device 10 on tone arms of differing sizes wherein the distance between the stylus 18 and the bottom surface of the tone arm case 14 may vary from one installation to another.

The cleaning pad 40 in the device according to the present invention may be easily cleaned by simply lifting the carrier 26 upwardly from the mounting pin 28 and wiping the collected dust from the velvet surface. The cleaning properties of the device are enhanced by the provision of a path for the flow of the static electricity charge normally built up upon the vinyl disc upwardly through the cleaning pad 40, the cleaning pad carrier 26, through the mounting post 28 and its bracket 42 to the grounded tone arm case 14.

It will be appreciated that there is provided in accordance with the present invention a record cleaning device which may be simply mounted on the tone arm of an automatic record changer or of any record player. The record cleaning device functions effectively and without attention as the record player operates and produces little or no interference with the normal playing functions of the phonograph equipment. Specifically, the bracket 24 and mounting post 28 are formed of small size and of lightweight material such that very little weight is added to the effective stylus pressure. Of course, the permanent mounting of this bracket may be compensated for by adjusting the normal spring or gravity bias on the tone arm. Furthermore, an extremely low vertical force is applied to the tone arm 12 from the cleaning pad carrier 26 since the majority of its weight is supported by contact between the cleaning pad 40 and the surface of the record 22.

The above describes one embodiment of the present invention and it should be recognized that other embodiments may be devised which may incorporate the concepts of the invention. Therefore, the following claims should be interpreted broadly in a manner consistent with the spirit and scope of the invention.

What I claim is:

1. A record cleaning device for mounting on a phonograph tone arm comprising a bracket, means for securing said bracket to the tone arm, a vertical mounting pin carried by said bracket forwardly of said tone arm and in substantial alignment with the stylus of the tone arm, a cleaning pad carrier formed with an opening at one end slightly larger than the diameter of said mounting pin and adapted to be engaged thereabout, a longitudinal cleaning pad secured to said carrier at the opposite end thereof and oriented perpendicular to a line between said mounting pin and said pad, and abutment means in cooperation with said mounting pin preventing movement of said carrier below a selected location along said mounting pin, said carrier opening and said mounting pin being sized so that said carrier is loosely carried by said mounting pin when the tone arm is on a record with the cleaning pad in contact with the record and the carrier substantially perpendicular to the mounting pin and so that the carrier is firmly engaged with said mounting pin when the tone arm is lifted off of a record and the carrier is moved out of perpendicular orientation with respect to the mounting pin.

2. A record cleaning device for mounting on a phonograph tone arm comprising a bracket, means for securing said bracket to the tone arm, a vertical mounting pin carried by said bracket forwardly of said tone arm and in substantial alignment with the stylus of the tone arm, a cleaning pad carrier formed with an opening at one end slightly larger than the diameter of said mounting pin and adapted to be engaged thereabout, a longitudinal cleaning pad secured to said carrier at the opposite end thereof and oriented perpendicular to a line between said mounting pin and said pad, and abutment means positioning said carrier at a selected location along said mounting pin including a resilient ring frictionally engaging said mounting pin, said carrier opening and the mounting pin being sized so that said carrier is loosely carried by said mounting pin when the tone arm is on a record with the cleaning pad in contact with the record and the carrier substantially perpendicular to the mounting post and so that the carrier is firmly engaged with said mounting pin when the tone arm is lifted off of a record and the carrier is not perpendicular to the mounting pin.

3. A record cleaning device for mounting on the tone arm of a phonograph comprising a bracket, means for securing said bracket to the tone arm, a vertical mounting pin carried by said bracket forwardly of said tone arm and in substantial alignment with the stylus of the tone arm, a cleaning pad carrier formed with an opening at one end slightly larger than the diameter of said mounting pin and adapted to be engaged thereabout, the walls of said opening being necked-down at one point along the length of said opening providing a line contact between said carrier and said mounting pin, a cleaning pad secured to said carrier at the opposite end thereof, and adjustable means positioning said carrier at a selected location along said mounting pin including a ring engaging said mounting pin, said cooperating necked-down portion of the carrier opening and the mounting pin being sized so that said carrier is loosely carried by said mounting pin when the tone arm is on a record with the cleaning pad in contact with the record and the carrier substantially perpendicular to the mounting post and so that the carrier is firmly engaged with said mounting pin when the tone arm is lifted off of a record and the carrier is moved out of perpendicular orientation with respect to the mounting pin.

4. A record cleaning device for mounting on a phonograph tone arm comprising a bracket, means for securing said bracket to the tone arm, a vertical mounting pin carried by said bracket forwardly of said tone arm and in substantial alignment with the stylus of the tone arm, a cleaning pad carrier formed with an opening at one end slightly larger than the diameter of said mounting pin and adapted to be engaged thereabout, the walls of said opening being necked-down at one point along the length of said opening providing a line contact between said carrier and said mounting pin, a longitudinal cleaning pad secured to said carrier at the opposite end thereof and oriented perpendicular to a line between said mounting pin and said pad, and adjustable means positioning said carrier at a selected location along said mounting pin including a resilient ring frictionally engaging said mounting pin, said necked-down portion of the carrier opening and the mounting pin being sized so that said carrier is loosely carried by said mounting pin when the tone arm is on a record with the cleaning pad in contact with the record and the carrier substantially perpendicular to the mounting pin and so that the carrier is firmly engaged with said mounting pin when the tone arm is lifted off of a record and the carrier is moved out of perpendicular orientation with respect to the mounting pin.

5. On the tone arm of a record changer, a record cleaning device comprising a bracket for securement to the tone arm, a vertical mounting pin carried by said bracket forwardly of said tone arm and in substantial alignment with the stylus of the tone arm, a cleaning pad carrier formed with an opening at one end slightly larger than the diameter of said mounting pin and adapted to be engaged thereabout, the walls of said opening being necked-down at one point along the length of said opening providing a line contact between said carrier and said mounting pin, a longitudinal cleaning pad secured to said carrier at the opposite end thereof and oriented perpendicular to a line between said mounting pin and said pad, and adjustable means positioning said carrier at a selected location along said mounting pin including a resilient ring frictionally engaging said mounting pin, said necked-down portion of the carrier opening and the mounting pin being sized so that said carrier is loosely carried by said mounting pin when the tone arm is on a record with the cleaning pad in contact with the record and the carrier substantially perpendicular to the mounting pin and so that the carrier is firmly engaged with said mounting pin when the tone arm is lifted off of a record and the carrier is moved out of perpendicular orientation with respect to the mounting pin.

6. A record cleaning device mounted on the tone arm of a phonograph comprising a bracket for securement to the tone arm, a vertical mounting pin carried by said bracket forwardly of said tone arm, a cleaning pad carrier formed with an opening at one end sized to be loosely engaged about said mounting pin when said carrier is perpendicular to said mounting pin and to be tightly engaged about said mounting pin when said carrier is askew to said mounting pin, a cleaning pad secured to said carrier at the opposite end thereof, and means positioning said carrier at a selected location along said mounting pin, said device being movable from a cleaning position with said cleaning pad engaging the surface of a record on the phonograph with the carrier loosely carried by the mounting pin and an inoperative position with said cleaning pad removed from a record and the carrier askew to and tightly engaged about said mounting pin.

References Cited by the Examiner

UNITED STATES PATENTS

| | | | |
|---|---|---|---|
| 1,242,751 | 10/17 | Worthington | 274—47 |
| 1,404,147 | 1/22 | Runk | 274—47 |
| 2,773,692 | 12/56 | Dunnavan | 274—47 |

NORTON ANSHER, *Primary Examiner.*